US012256782B2

(12) United States Patent
Chen

(10) Patent No.: US 12,256,782 B2
(45) Date of Patent: Mar. 25, 2025

(54) HEATING DEVICE AND MANUFACTURING METHOD THEREFOR, AND HEAT-NOT-BURN SMOKING DEVICE

(71) Applicant: Shenzhen Huachengda Precision Industry Co. Ltd., Guangdong (CN)

(72) Inventor: Ping Chen, Guangdong (CN)

(73) Assignee: Shenzhen Huachengda Precision Industry Co. Ltd., Shenzhen (CN)

( * ) Notice: Subject to any disclaimer, the term of this patent is extended or adjusted under 35 U.S.C. 154(b) by 372 days.

(21) Appl. No.: 17/764,974

(22) PCT Filed: May 19, 2020

(86) PCT No.: PCT/CN2020/091097
§ 371 (c)(1),
(2) Date: Mar. 29, 2022

(87) PCT Pub. No.: WO2021/232250
PCT Pub. Date: Nov. 25, 2021

(65) Prior Publication Data
US 2022/0346451 A1 Nov. 3, 2022

(51) Int. Cl.
*A24F 40/46* (2020.01)
*A24F 40/20* (2020.01)
(Continued)

(52) U.S. Cl.
CPC .............. *A24F 40/46* (2020.01); *A24F 40/20* (2020.01); *A24F 40/70* (2020.01); *H05B 3/22* (2013.01)

(58) Field of Classification Search
CPC .......... A24F 40/20; A24F 40/46; A24F 40/10; A24F 40/40; A24F 40/42; A24F 47/00; A24F 1/00; A24F 7/04; A24F 13/02
See application file for complete search history.

(56) References Cited

U.S. PATENT DOCUMENTS 8,424,537 B2 * 4/2013 Rosenthal ............ A61M 11/041 131/191
10,721,965 B2 * 7/2020 Lipowicz ................ H05B 3/34
(Continued)

FOREIGN PATENT DOCUMENTS

CN 103974640 A 8/2014
CN 107252139 A 10/2017
(Continued)

OTHER PUBLICATIONS

The Office Action of Canadian patent application No. 3154806 issued on Jun. 16, 2023.
(Continued)

*Primary Examiner* — Truc T Nguyen
(74) *Attorney, Agent, or Firm* — Andrew C. Cheng

(57) ABSTRACT

A heating device and a manufacturing method therefor, and a heat-not-burn smoking device. The heating device includes a first heating assembly, including a first housing configured for contacting with a tobacco, a first heating element on the first housing and configured to generate heat when electrified, and a first insulator between the first heating element and the first housing. The first heating element generates heat when electrified, the heat is conducted to the first housing through the first insulator, to heat but not burn the tobacco. The heating device is formed by cooperation of the heating element, the insulator and the housing, and heats the tobacco by the heating element when electrified. Compared with a heating conductive layer formed by a thick film printing process, the manufacturing of the heating device is simpler and more convenient, and the consistency and service life of the product are greatly improved.

18 Claims, 10 Drawing Sheets

(51) Int. Cl.
*A24F 40/70* (2020.01)
*H05B 3/22* (2006.01)

(56) References Cited

U.S. PATENT DOCUMENTS

| | | | | |
|---|---|---|---|---|
| 11,497,253 B2 * | 11/2022 | Litten | H05B 1/0283 | |
| 11,980,232 B2 * | 5/2024 | Zhao | A24F 13/08 | |
| 2014/0305455 A1 * | 10/2014 | Crooks | A24D 3/061 | 131/332 |
| 2015/0181934 A1 * | 7/2015 | Lyubomirskiy | A24F 40/46 | 131/329 |
| 2016/0044963 A1 * | 2/2016 | Saleem | H05B 3/06 | 131/328 |
| 2016/0073694 A1 * | 3/2016 | Liu | A24F 40/46 | 131/329 |
| 2016/0073695 A1 * | 3/2016 | Sears | H05B 3/46 | 131/329 |
| 2017/0231284 A1 * | 8/2017 | Newns | A61M 15/06 | 131/328 |
| 2019/0380389 A1 * | 12/2019 | Hong | A24D 1/02 | |
| 2023/0145757 A1 * | 5/2023 | Han | A24F 13/16 | 131/175 |

FOREIGN PATENT DOCUMENTS

| | | | | |
|---|---|---|---|---|
| CN | 108903062 A | 11/2018 | | |
| CN | 208354597 U | 1/2019 | | |
| CN | 208446607 U | 2/2019 | | |
| CN | 208891725 U | 5/2019 | | |
| CN | 110839965 A | 2/2020 | | |
| CN | 111035070 A | 4/2020 | | |
| CN | 210248380 U | 4/2020 | | |
| CN | 111134373 A | 5/2020 | | |
| CN | 212325392 U | 1/2021 | | |
| CN | 214229850 | * | 9/2021 | A24F 40/46 |
| JP | 2001-297857 A | 10/2001 | | |
| JP | 2015-506170 A | 3/2015 | | |

OTHER PUBLICATIONS

The extended European search report of EP patent application No. 20936212.8 issued on Oct. 14, 2022.

Communication pursuant to Article 94(3) EPC of EP patent application No. 20936212.8 issued on Jun. 27, 2024.

The Office Action of JP patent application No. 2021-571933 issued on Mar. 7, 2023.

The Office Action of KR patent application No. 10-2021-7039341 issued on Mar. 15, 2024.

International Search Report of PCT Patent Application No. PCT/CN2020/091097 issued on Feb. 18, 2021.

The Office Action of CN patent application No. 202010427359.2 issued on Oct. 21, 2024.

The Search Report of CN patent application No. 202010427359.2 issued on Oct. 21, 2024.

* cited by examiner

HEATING DEVICE AND MANUFACTURING METHOD THEREFOR, AND HEAT-NOT-BURN SMOKING DEVICE

TECHNICAL FIELD

The present disclosure relates to the technical field of a heat-not-burn smoking device, in particular to a heating device and a manufacturing method therefor, and a heat-not-burn smoking device.

DESCRIPTION OF RELATED ART

In a low-temperature heat-not-burn smoking device for baking and heating a cigarette in related art, a heating element thereof is mainly formed by printing an electric heating conductive layer on a surface of an insulating metal or a ceramic through a thick film printing process. The above process has the following disadvantages.

Since the resistance paste is a mixture of metal, alloy powder and a binder, there is a problem of uneven mixing, which will result in unstable resistance and poor product consistency. The electric heating conductive layer formed by the thick film printing process has a small cross-sectional area, thus the problem of aging and open circuit is prone to occurring when working in a high temperature environment for a long time, resulting a short service life of the electric heating conductive layer. Besides, the above process further has many problems, such as various manufacturing procedures, expensive cost of materials and equipment, and the like.

SUMMARY OF THE DISCLOSURE

The present disclosure aims to provide, in view of the above-described deficiencies of the prior art, a heating device with an improved product consistency and an improved service life, and a manufacturing method for the heating device, and a heat-not-burn smoking device with the heating device.

A technical solution adopted by the present disclosure is to provide a heating device for a heat-not-burn smoking device; wherein the first heating assembly includes a first housing configured to be in contact with a tobacco, a first heating element disposed on the first housing and configured to generate heat when electrified, and a first insulator disposed between the first heating element and the first housing; and the first heating element generates heat when electrified, the heat is conducted to the first housing through the first insulator, to heat but not burn the tobacco to generate smoke.

In an embodiment, the first heating assembly further includes a first high temperature resistant non-stick coating disposed on a surface, configured for contacting with the tobacco, of the first housing.

In an embodiment, a thickness of the first high temperature resistant non-stick coating is 0.5 μm-500 μm.

In an embodiment, one end of the first housing is open to form an open end; an outer surface of the first housing defines a heating surface in contact with the tobacco; and the first heating element is inserted in the first housing along a length direction of the first housing, and two pins of the first heating element extend out of the open end of the first housing; and the first insulator is filled in the first housing and covers the first heating element.

In an embodiment, another end opposite to the open end of the first housing is closed to form a closed end, and the closed end is tapered.

In an embodiment, an insulating base is formed at an end portion of the first insulator; and an end surface of the open end of the first housing is spaced apart or in contact with the insulating base, or an end portion of the open end of the first housing is embedded in the insulating base.

In an embodiment, the first heating element is in a sheet shape, a spiral shape or a tubular shape.

In an embodiment, the heating device further includes a second heating element; the first heating assembly extends axially in the second heating assembly, and an annular space for receiving the tobacco is defined between an outer circumference of the first heating assembly and an inner circumference of the second heating assembly.

In an embodiment, the second heating assembly includes a tubular second housing with two end open, a second insulator sleeved on an outer circumference of the second housing, and a second heating element embedded in the second insulator and located at an outer periphery of the second housing; and two pins of the second heating element and two pins of the first heating element extend out of the second insulator.

In an embodiment, the second heating assembly further includes a second high temperature resistant non-stick coating disposed on an inner surface of the second housing.

In an embodiment, a thickness of the second high temperature resistant non-stick coating is 0.5 μm to 500 μm.

In an embodiment, one end of the second insulator is open and is communicated with the annular space; and another opposite end of the second insulator is closed to form a closed end, and at least one second vent hole is defined in the closed end; and the first heating assembly is fixed on the closed end of the second insulator.

In an embodiment, the second heating element includes a heating tube, and a hollow portion is provided in a sidewall of the heating tube.

In an embodiment, the first housing is a housing with two opposite ends open; and an inner surface of the first housing defines a heating surface in contact with the tobacco; and;

the first insulator is tubular and is sleeved on an outer circumference of the first housing; and the first heating element is embedded in the first insulator along a length direction of the first insulator, and is located on an outer periphery of the first housing; two pins of the first heating element extend out of the first insulator.

In an embodiment, the first heating element includes a heating tube; a hollow portion is provided in a sidewall of the heating tube.

In an embodiment, one end of the first insulator is open and communicated with an open end of the first housing to form an inlet for inserting the tobacco into the first housing; and another opposite end of the first insulator is closed to form a closed end, and at least one first vent is provided in the closed end.

The present disclosure further provides a manufacturing method for the heating device described in any one of the above, including a manufacturing of the first heating assembly; and the manufacturing of the first heating assembly includes the following steps:

S1.1, preparing a first housing, a first heating element and an insulating paste for a first insulator;

S1.2, placing and fixing the first housing and the first heating element in a forming mold;

wherein, the first heating element is located within or at an outer periphery of the first housing;

S1.3, injecting the insulating paste into the forming mold, cooling and hardening the insulating paste to form a preform of the first insulator, which forms a first semi-finished heating assembly together with the first housing and the first heating element;

wherein, the preform is filled in the first housing and covers the first heating element; or the preform is wrapped around outer peripheries of the first housing and the first heating element and fills a space between the first housing and the first heating element; and S1.4, sintering the first semi-finished heating assembly at a high temperature, and solidifying the preform to form the first insulator, to obtain the first heating assembly.

In an embodiment, the manufacturing method for the heating device further includes a manufacturing of a second heating assembly; and the manufacturing of the second heating assembly includes the following steps:

S2.1, preparing a second housing, a second heating element and an insulating paste of a second insulator;

S2.2, placing and fixing the second housing and the second heating element in a forming mold;

wherein, the second heating element is located on an outer periphery of the second housing;

S2.3, injecting the insulating paste into the forming mold, cooling and hardening the insulating paste to form a preform of the second insulator, which forms a second semi-finished heating assembly together with the second housing and the second heating element;

wherein, the preform is wrapped around outer peripheries of the second housing and the second heating element and fills a space between the second housing and the second heating element;

S2.4, sintering the second semi-finished heating assembly at a high temperature, and solidifying the preform to form the second insulator, to obtain a second heating assembly.

In an embodiment, the manufacturing method for the heating device further includes: axially inserting the first heating assembly into the second heating assembly; and wherein, an annular space for receiving a tobacco is defined between an outer circumference of the first heating assembly and an inner circumference of the second heating assembly; and two pins of the first heating element and two pins of the second heating element extend out of the second insulator.

The present disclosure further provides a heat-not-burn smoking device, including the heating device described in any one of the above.

The heating device of the present disclosure used in the heat-not-burn smoking devices, is formed through cooperation of the heating element, the insulator and the housing, and heats the tobacco by the heating element when electrified. Compared with the heating conductive layer formed by the existing thick film printing process, the manufacturing of the heating device of the present disclosure is simpler and more convenient, and the consistency and service life of the product are greatly improved; the materials and equipment required for production are simple and cheap, which greatly reduces the cost of production while improving the performance of the product.

BRIEF DESCRIPTION OF THE DRAWINGS

The present disclosure will be further described below in conjunction with the attached drawings and embodiments, and in the drawings.

DESCRIPTION OF THE EMBODIMENTS

For better understanding of the technical features, objects and effects of the present disclosure, the specific embodiments of the present disclosure will be described in detail with reference to the accompanying drawings.

A heating device of the present disclosure is used in a heat-not-burn smoking device, to heat but not burn tobacco, making it atomized to generate smoke for users to inhale.

Figure 1:
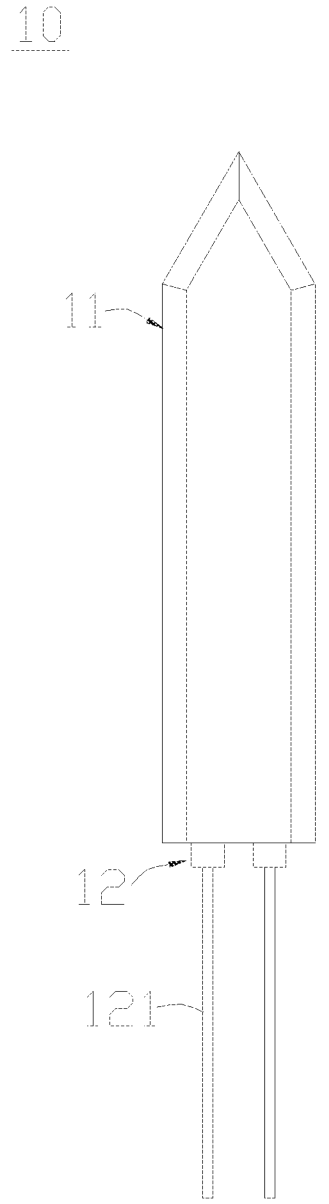
FIG. 1 is a schematic structural view of a heating device according to a first embodiment of the present disclosure.
Figure 2:
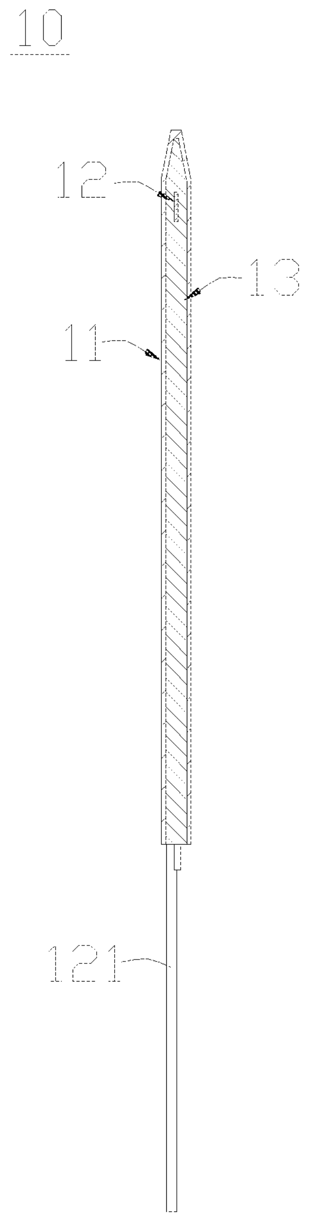
FIG. 2 is a longitudinal sectional view of the heating device shown in FIG. 1.
Figure 3:
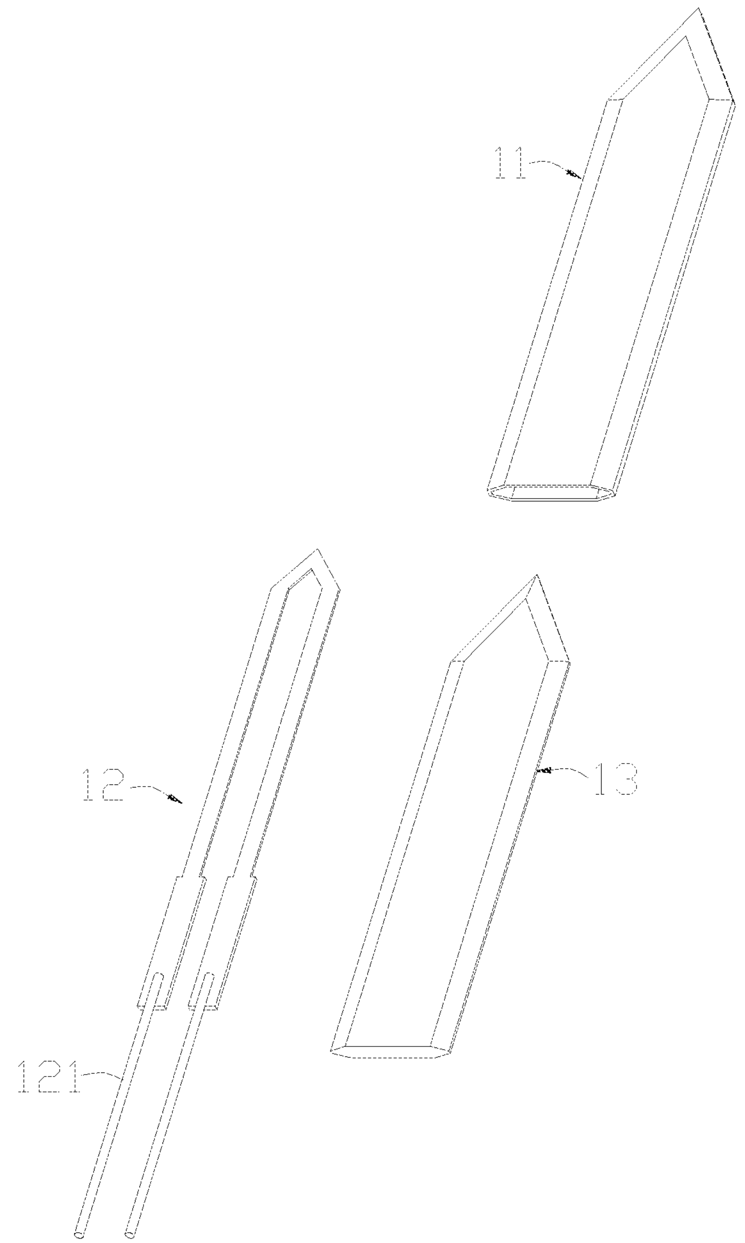
FIG. 3 is an exploded view of the heating device shown in FIG. 1.

As shown in FIGS. 1 to 3, a heating device according to a first embodiment of the present disclosure includes a first heating assembly 10.

The first heating assembly 10 includes a first housing 11, a first heating element 12 disposed on the first housing 11, and a first insulator 13 disposed between the first heating element 12 and the first housing 11. The first housing 11 is configured to be in contact with the tobacco, the first heating element 12 is configured to generate heat when electrified, and the first insulator 13 is configured to isolate the first heating element 12 and the first housing 11 to avoid problems such as short circuit caused by contact therebetween. The first heating element 12 generates heat when being energized, and the heat is transferred to the first housing 11 through the first insulator 13, and the tobacco is heated but not burned through the first housing 11 to generate smoke.

In this embodiment, the first housing 11 is a housing with one end closed and another end open. The first heating element 12 is inserted in the first housing 11 along a length direction of the first housing 11, and two pins 121 of the first heating element 12 extend out of the open end of the first housing 11 for being connected with an external power supply. The first insulator 13 is filled in the first housing 11 and covers the first heating element 12.

An inner surface of the first housing 11 is closely attached to the first insulator 13, and an outer surface of the first housing 11 defines a heating surface in contact with the tobacco. When in use, the first heating assembly 10 is inserted into the tobacco via the first housing 11, and the heating surface is inserted into the tobacco to heat and atomize it.

In order to enable the first heating assembly 10 to be smoothly inserted into the tobacco, the closed end of the first housing 11 is tapered so that the tip at the top of the tapered end can be better inserted into the tobacco. A through hole can be further provided in the closed end of the first housing 11 for ventilation or grouting, etc.

The first housing 11 is made of a material with a temperature resistance exceeding 500° C., such as metal, ceramic, quartz, mica, glass or the like.

Specifically, in this embodiment, the first housing 11 is a flat hollow housing. Corresponding to the flat first housing 11, the first heating element 12 is in a shape of a sheet as a whole. A heating body of the first heating element 12 can be formed by bending a long metal sheet along an inner circumference of the first housing 11. Two ends of the metal sheet correspond to the open end of the first housing 11 and are connected to two pins 121 respectively.

A per meter resistance (resistance value per meter) of the heating body of the first heating element 12 is greater than a per meter resistance of the pin 121.

The first heating element 12 is made of a metal material with a resistance-temperature curve characteristic, preferably made of at least one of nickel-chromium alloy, iron-chromium-aluminum alloy, stainless steel, nickel wire, nickel-iron alloy, copper-nickel alloy, titanium and titanium alloy and so on.

The first insulator 13 is filled in the first housing 11 and coats the first heating element 12, so that the first heating element 12 is embedded in the first insulator 13 and insulated from the first housing 11. The first insulator 13 has a cylindrical structure, with a shape corresponds to that of an inner circumference of the first housing 11.

The first insulator 13 is preferably made of a porous ceramic material, and has properties such as electrical insulation and a good thermal conductivity. During preparation, an insulating paste is prepared from a porous ceramic powder and a binder and the like, and then an insulator with a certain structural strength is formed by filling, curing and other processes.

Further, the first heating assembly 10 further includes a first high temperature resistant non-stick coating (not shown) provided on a surface, configured for contacting with the tobacco, of the first housing 11. In this embodiment, since the outer surface of the first housing 11 is the heating surface in contact with the tobacco, the first high temperature resistant non-stick coating is disposed on the outer surface of the first housing 11 to ensure that the tobacco is smoothly removed from the first housing 11, prevent tobacco residue from sticking to the first housing 11 after use, and ensure the cleanliness of the outer surface of the first housing 11.

The first high temperature resistant non-stick coating is made of a material that can withstand a high temperature above 300° C. As an option, a thickness of the first high temperature resistant non-stick coating is 0.5 μm to 500 μm.

A manufacturing method for the heating device of the first embodiment includes a manufacturing of the first heating assembly 10. Referring to FIGS. 1 to 3, the manufacturing of the first heating assembly 10 may include the following steps:

S1.1, preparing the first housing 11, the first heating element 12 and the insulating paste for the first insulator 13.

Wherein, the first housing 11 can be made by process such as stamping, etching, cutting, wire drawing, welding, injection molding, sintering, or the like. The first heating element 12 can be made by process such as etching, cutting, welding, winding, or the like.

The step S1.1 further includes coating the first high temperature resistant non-stick coating on the outer surface of the first housing 11.

S1.2, placing and fixing the first housing 11 and the first heating element 12 in a forming mold.

Wherein, the first heating element 12 is located in the first housing 11, a length direction of the first heating element 12 is parallel to a length direction of the first housing 11, and there is no contact between the first heating element 12 and the first housing 11. The two pins 121 of the first heating element 12 are located outside the first housing 11.

S1.3, injecting the insulating paste into the forming mold, cooling and hardening the insulating paste to form a preform of the first insulator 13, which forms a first semi-finished heating assembly together with the first housing 11 and the first heating element 12.

Wherein, when injecting the insulating paste, the insulating paste is mainly injected into the first housing 11, and meanwhile, fills a space between the first housing 11 and the first heating element 12.

After the preform is formed, the preform is filled in the first housing 11 and covers the first heating element 12.

S1.4, sintering the first semi-finished heating assembly at a high temperature, to solidify the preform to form the first insulator 13, so that the first heating assembly 10 is prepared.

Wherein, the first semi-finished heating assembly is taken out of the forming mold, put in a sintering carrier, and then put in a high-temperature sintering furnace for high-temperature sintering. Then the preform is cured to form the first insulator 13 which is tightly connected between the first housing 11 and the first heating element 12, thereby the first heating assembly 10 is prepared.

Figure 4:
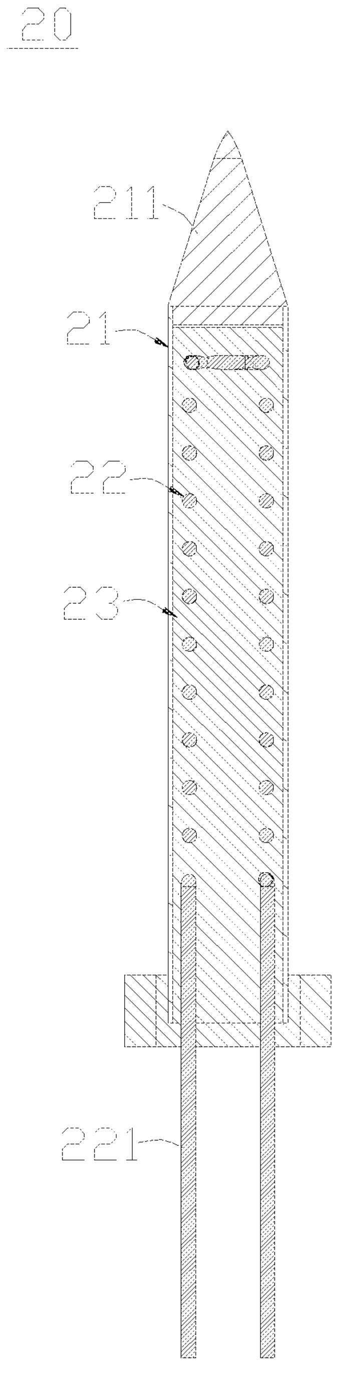
FIG. 4 is a sectional view of a heating device according to a second embodiment of the present disclosure.
Figure 5:
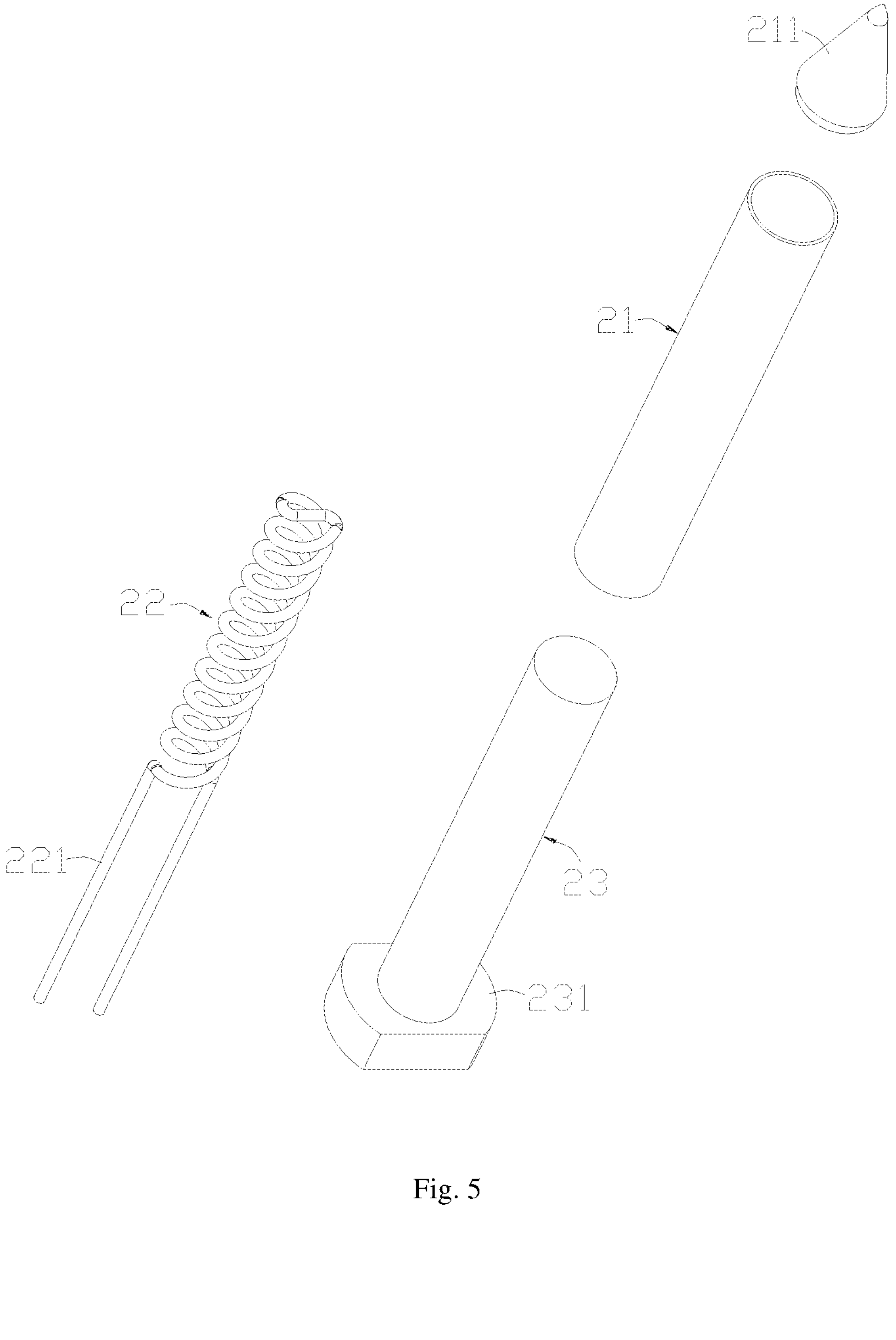
FIG. 5 is an exploded view of the heating device according to the second embodiment of the present disclosure.

As shown in FIGS. 4 and 5, a heating device of a second embodiment of the present disclosure includes a first heating assembly 20.

The first heating assembly 20 includes a first housing 21, a first heating element 22 disposed on the first housing 21, and the first insulator 23 disposed between the first heating element 22 and the first housing 21. The first housing 21 is configured to be in contact with the tobacco, the first heating element 22 is configured to generate heat when electrified, and the first insulator 23 is configured to isolate the first heating element 22 and the first housing 21 to avoid problems such as short circuit caused by contact therebetween. The first heating element 22 generates heat when being energized, and the heat is transferred to the first housing 21 through the first insulator 23, and the tobacco is heated but not burned through the first housing 21 to generate smoke.

The first housing 21 is a housing having a closed end and an open end opposite to the closed end. The first heating element 22 is extended in the first housing 21 along a length direction of the first housing 21, and two pins 221 of the first heating element 22 extend out of the open end of the first housing 21 for being connected with an external power supply. The first insulator 23 is filled in the first housing 21 and covers the first heating element 22.

An inner surface of the first housing 21 is in tight contact with the first insulator 23, and an outer surface of the first housing 21 defines a heating surface in contact with the tobacco. When in use, the first heating assembly 20 is inserted into the tobacco via the first housing 21, and the heating surface is inserted into the tobacco to heat and atomize it.

Different from the above-mentioned first embodiment, in this embodiment, the first housing 21 is a cylindrical hollow housing. The closed end of the first housing 21 is tapered to form a tapered end 211. The tapered end 211 may be integrated on the first housing 21, or may be separately prepared and then connected to form a whole body. A through hole may be provided in the closed end of the first housing 21 for ventilation or grouting, etc.

Corresponding to the cylindrical first housing 21, the first heating element 22 has a spiral shape and an outer diameter smaller than an inner diameter of the first housing 21. A heating body of the first heating element 21 is formed by spirally winding a heating wire, and two ends of the heating wire correspond to the open end of the first housing 21 and are connected to the two pins 221 respectively. A per meter resistance of the heating body of the first heating element 22 is greater than that of the pin 221.

The first heating element 22 is made of a metal material with a resistance-temperature curve characteristic, preferably made of at least one of nickel-chromium alloy, iron-chromium-aluminum alloy, stainless steel, nickel wire, nickel-iron alloy, copper-nickel alloy, titanium and titanium alloy and so on.

The first insulator 23 is filled in the first housing 21 and covers the first heating element 22, so that the first heating element 22 is embedded in the first insulator 23 and insulated from the first housing 21. The first insulator 23 has a cylindrical structure corresponding to the inner space of the first housing 11.

The first insulator 23 is preferably made of a porous ceramic material, and has properties such as electrical insulation and a good thermal conductivity. During preparation, an insulating paste is prepared from a porous ceramic powder and a binder and the like, and then an insulator with a certain structural strength is formed by filling, curing and other processes.

Furthermore, in this embodiment, an insulating base 231 is formed at one end of the first insulator 23. The insulating base 231 is integrated on the first insulator 23.

An end surface of the open end of the first housing 21 may be abutted against the insulating base 231, or the end surface of the open end of the first housing 21 is spaced from the insulating base 231. Or alternatively, as shown in FIG. 4, an end portion of the open end of the first housing 21 is embedded in the insulating base 231, so that the end surface of the open end is located in the insulating base 231, and the insulating base 231 surrounds an outer periphery of the open end of the first housing 21, and meanwhile, surrounds portions of the pins 221 of the first heating element 22, to improve the structural stability.

The first heating assembly 20 further includes a first high temperature resistant non-stick coating (not shown) provided on a surface, configured for contacting with the tobacco, of the first housing 21. The specific setting of the first high temperature resistant non-stick coating can refer to the above-mentioned first embodiment, which will not be repeated here.

The manufacturing method for the heating device of the second embodiment, can refer to the manufacturing method for the heating device of the above-mentioned first embodiment, which will not be repeated here.

Figure 6:
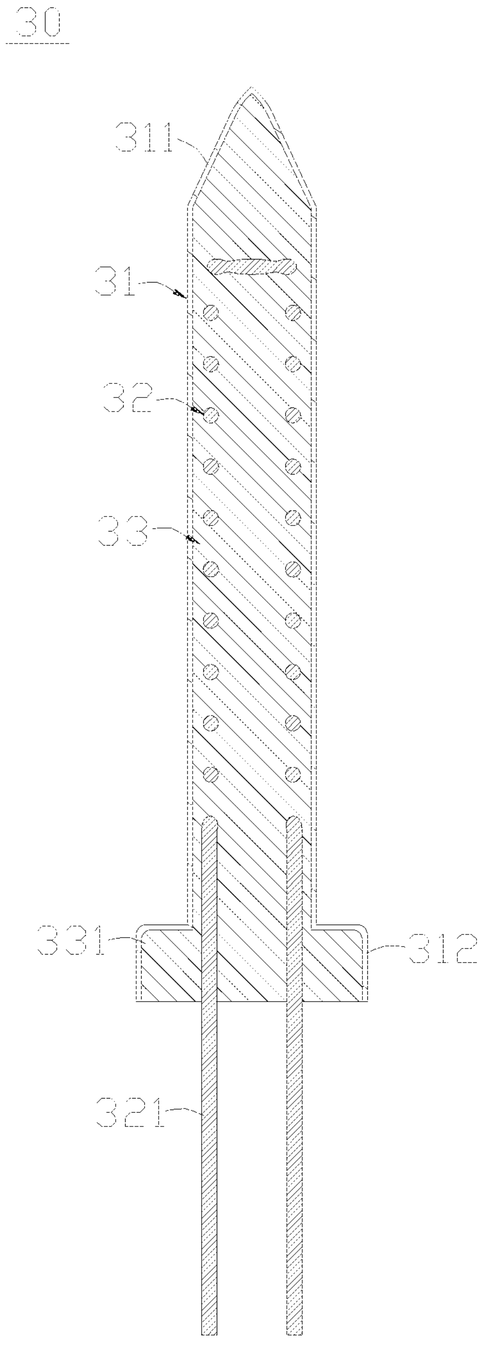
FIG. 6 is a sectional view of a heating device according to a third embodiment of the present disclosure.

As shown in FIG. 6, a heating device of a third embodiment of the present disclosure includes a first heating assembly 30.

The first heating assembly 30 includes a first housing 31, a first heating element 32 on the first housing 31, and a first insulator 33 disposed between the first heating element 32 and the first housing 31. The first housing 31 is configured to be in contact with the tobacco, the first heating element 32 is configured to generate heat when electrified, and the first insulator 33 is configured to isolate the first heating element 32 and the first housing 31 to avoid problems such as short circuit caused by contact therebetween. The first heating element 32 generates heat when being energized, and the heat is transferred to the first housing 31 through the first insulator 33, and the tobacco is heated but not burned through the first housing 31 to generate smoke.

The first housing 31 is a housing with one end closed and another end open. The first heating element 32 is inserted in the first housing 31 along a length direction of the first housing 31, and two pins 321 of the first heating element 32 extend out of the open end of the first housing 31 for being connected with an external power supply. The first insulator 33 is filled in the first housing 31 and covers the first heating element 32.

An inner surface of the first housing 31 is closely attached to the first insulator 33, and an outer surface of the first housing 31 defines a heating surface in contact with the tobacco. When in use, the first heating assembly 30 is inserted into the tobacco via the first housing 31, and the heating surface is inserted into the tobacco to heat and atomize it.

In this embodiment, the first housing 31 is a cylindrical hollow housing. The closed end of the first housing 31 is tapered to form a tapered end 311. The tapered end 311 may be integrated on the first housing 31, or may be separately prepared and then connected to form a whole body. A through hole may be provided in the closed end of the first housing 31 for ventilation or grouting, etc.

Corresponding to the cylindrical first housing 31, the first heating element 32 has a spiral shape and has an outer diameter smaller than an inner diameter of the first housing 31. A heating body of the first heating element 32 is formed by spirally winding a heating wire, and two ends of the heating wire correspond to the open end of the first housing 31 and are respectively connected to the two pins 321. A per meter resistance of the heating body of the first heating element 32 is greater than a per meter resistance of the pin 321.

The materials of the first housing 31 and the first heating element 32 can be referred to the related description of the above-mentioned second embodiment above.

Furthermore, in this embodiment, an end portion of the first insulator 33 forms an insulating base 331. The insulating base 331 is integrally formed with the first insulator 33, and has a diameter larger than that of the first insulator 33.

The difference of this embodiment compared with the above-mentioned second embodiment described above is: the open end of the first housing 31 is connected to a receiving portion 312, and the insulating base 331 is disposed in the receiving portion 312. The receiving portion 312 and the insulating base 331 can be used as an installation bottom of the first heating assembly 30, which facilitates the installation of the heating device in the smoking device.

The first heating assembly 30 further includes a first high temperature resistant non-stick coating (not shown). The specific structure of the first high-temperature resistant non-stick coating can refer to the above-mentioned first embodiment.

The manufacturing method for the heating device of the third embodiment can refer to the manufacturing method for the heating device of the above-mentioned first embodiment, which will not be repeated here.

In addition, the first heating elements 22 and 32 in the above-mentioned second and third embodiments are not limited to the spiral shape, and may be provided in other shape such as a tube shape, alternatively.

Figure 7:
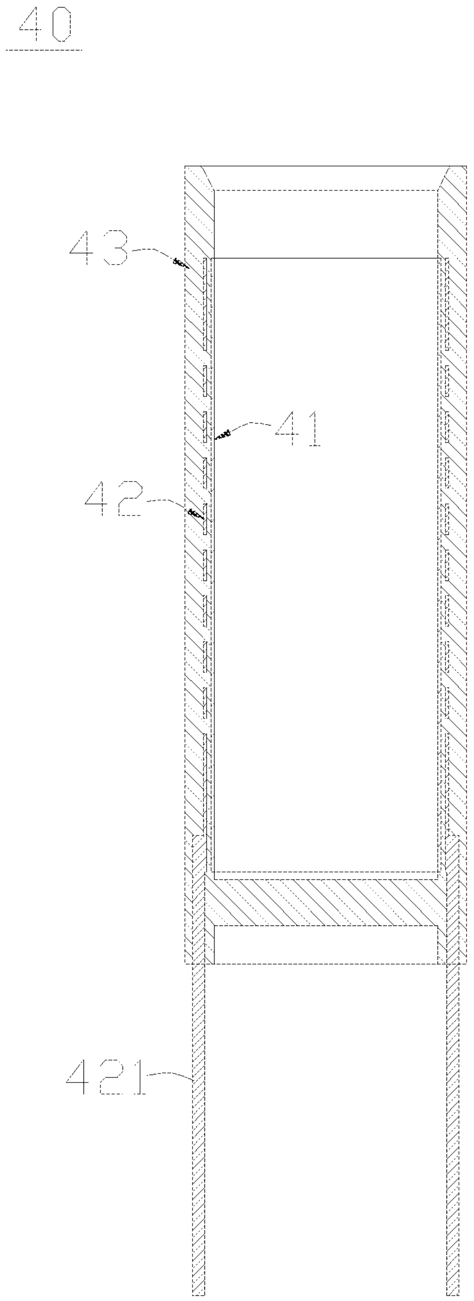
FIG. 7 is a sectional view of a heating device according to a fourth embodiment of the present disclosure.
Figure 8:
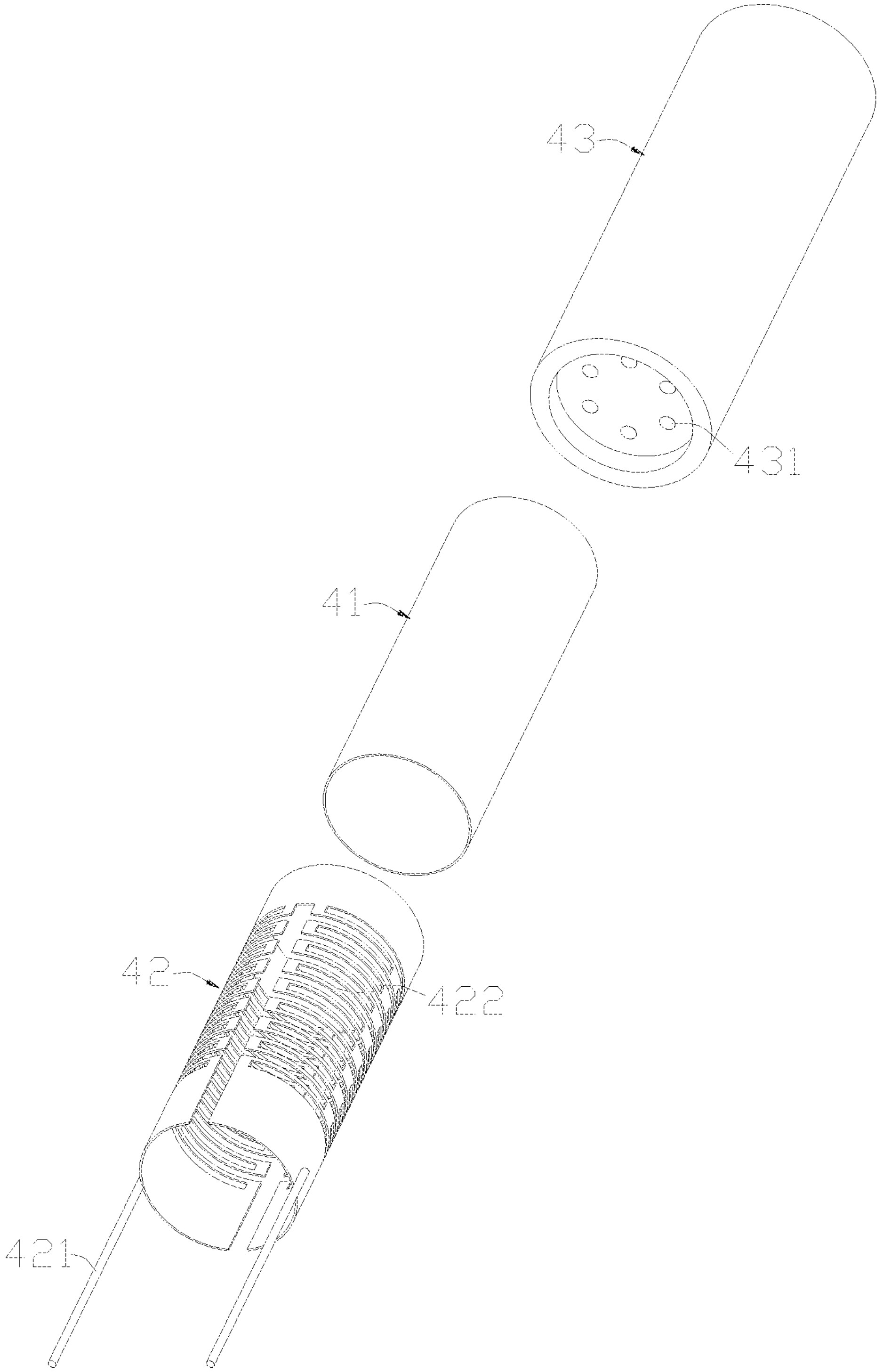
FIG. 8 is an exploded view of the heating device according to the fourth embodiment of the present disclosure.

As shown in FIGS. 7 and 8, a heating device of a fourth embodiment of the present disclosure includes a first heating assembly 40.

The first heating assembly 40 includes a first housing 41, a first heating element 42 disposed on the first housing 41, and a first insulator 43 disposed between the first heating element 42 and the first housing 41. The first housing 41 is configured to be in contact with the tobacco, the first heating element 42 is configured to generate heat when electrified, and the first insulator 43 is configured to isolate the first heating element 42 and the first housing 41 to avoid problems such as short circuit caused by contact therebetween. The first heating element 42 generates heat when being energized, and the heat is transferred to the first housing 41 through the first insulator 43, and the tobacco is heated but not burned through the first housing 41 to generate smoke.

In this embodiment, the first housing 41 is a housing with two opposite ends open. The first insulator 43 has a tubular structure and is sleeved on an outer circumference of the first housing 41. An outer surface of the first housing 41 is in close contact with an inner surface of the first insulator 43. The first heating element 42 is embedded in the first insulator 43 along a length direction of the first insulator 43 and is located at an outer periphery of the first housing 41, and is insulated from the first housing 41 by the first insulator 43. Two pins 421 of the first heating element 42 extend out of the first insulator 43 for being connected with an external power supply.

An inner surface of the first housing 41 forms a heating surface in contact with the tobacco. When the first heating assembly 40 is in use, the tobacco is inserted into the first housing 41 and contacts the heating surface, and the tobacco is heated and atomized by the heating surface.

The first housing 41 is made of a material with a temperature resistance exceeding 500° C., such as metal, ceramic, quartz, mica, glass, or the like.

Specifically, in this embodiment, the first housing 41 is a cylindrical hollow housing, and the first insulator 43 is correspondingly a circular tubular shape and is sleeved on the outer periphery of the first housing 41. In an embodiment, an axial length of the first insulator 43 is greater than an axial length of the first housing 41, so that the end portion/portions of the first housing 41 will not extend out of the first insulator 43. One end of the first insulator 43 is open and is communicated with the open end of the first housing 41 to define an inlet for inserting tobacco into the first housing 41. Another end opposite to the open end of the first insulator 43 is closed to form a closed end. At least one first vent hole 431 is provided in the closed end.

Corresponding to the cylindrical first housing 41, the first heating element 42 includes a heating tube. The heating tube can be formed by winding a heating sheet, and a hollow portion 422 can be further provided in a sidewall of the heating tube. The two pins 421 are relatively connected to two sides of an end portion of the heating tube. A per meter resistance of the first heating element 42 is greater than a per meter resistance of the pin 421.

The first heating element 42 is made of a metal material with a resistance-temperature curve characteristic, preferably made of at least one of nickel-chromium alloy, iron-chromium aluminum alloy, stainless steel, nickel wire, nickel-iron alloy, copper-nickel alloy, titanium, titanium alloy, and so on.

The first insulator 43 is preferably made of a porous ceramic material, and has properties such as electrical insulation and a good thermal conductivity. During preparation, an insulating paste is prepared from a porous ceramic powder and a binder and the like, and then an insulator with a certain structural strength is formed by filling, curing, etc. A portion of the first insulator 43 is filled in a space between the first housing 41 and the first heating element 42 to insulate them.

Furthermore, the first heating assembly 40 further includes a first high temperature resistant non-stick coating (not shown) disposed on a surface, configured for contacting with the tobacco, of the first housing 41. In this embodiment, since the inner surface of the first housing 41 defines the heating surface in contact with the tobacco, the first high temperature resistant non-stick coating is disposed on the inner surface of the first housing 41 to ensure a smooth removal of the tobacco in the first housing 41, prevent tobacco residue from adhering to the inner surface of the first housing 41 after use, and ensure the cleanliness of the inner surface of the first housing 41.

The first high temperature resistant non-stick coating is made of a material that can withstand a high temperature above 300° C. As an option, a thickness of the first high temperature resistant non-stick coating is 0.5 μm to 500 μm.

A manufacturing method for the heating device of the fourth embodiment includes a manufacturing of the first heating assembly 40. Referring to FIGS. 7 and 8, the manufacturing of the first heating assembly 40 may include the following steps:

S1.1, preparing the first housing 41, the first heating element 42 and the insulating paste for the first insulator 43.

Wherein, the first housing 41 can be made by at least one process such as stamping, etching, cutting, wire drawing, welding, injection molding, sintering, and so on. The first heating element 42 can be made by at least one process such as etching, cutting, welding, winding, and so on.

The step S1.1 further includes coating the first high temperature resistant non-stick coating on the inner surface of the first housing 41.

S1.2, placing and fixing the first housing 41 and the first heating element 42 in a forming mold.

Wherein, the first heating element 42 is located on the outer periphery of the first housing 41. The length direction of the first heating element 42 is parallel to the length direction of the first housing 41, and the first heating element 42 and the first housing 41 are spaced apart from each other. The two pins 421 of the first heating element 42 are located outside the first housing 41.

S1.3, injecting the insulating paste into the forming mold, cooling and hardening the insulating paste to form a preform of the first insulator 43, which forms a first semi-finished heating assembly together with the first housing 41 and the first heating element 42.

Wherein, when injecting the insulating paste, the insulating paste is mainly injected into the outer peripheries of the first housing 41 and the first heating element 42, and meanwhile, fills the space between the first housing 41 and the first heating element 42.

After the preform is formed, the preform is wrapped around the outer peripheries of the first housing 41 and the first heating element 42, and meanwhile, fills the space between the first housing 41 and the first heating element 42.

S1.4, sintering the first semi-finished heating assembly at a high temperature, to solidify the preform to form the first insulator 43, so that the first heating assembly 40 is prepared.

Wherein, the first semi-finished heating assembly is taken out from the forming mold, put in a sintering carrier, and then placed in a high-temperature sintering furnace for high-temperature sintering. Then the preform is solidified to form the first insulator 43 which is tightly connected between the first housing 41 and the first heating element 42 and forms the first heating assembly 40.

Figure 9:
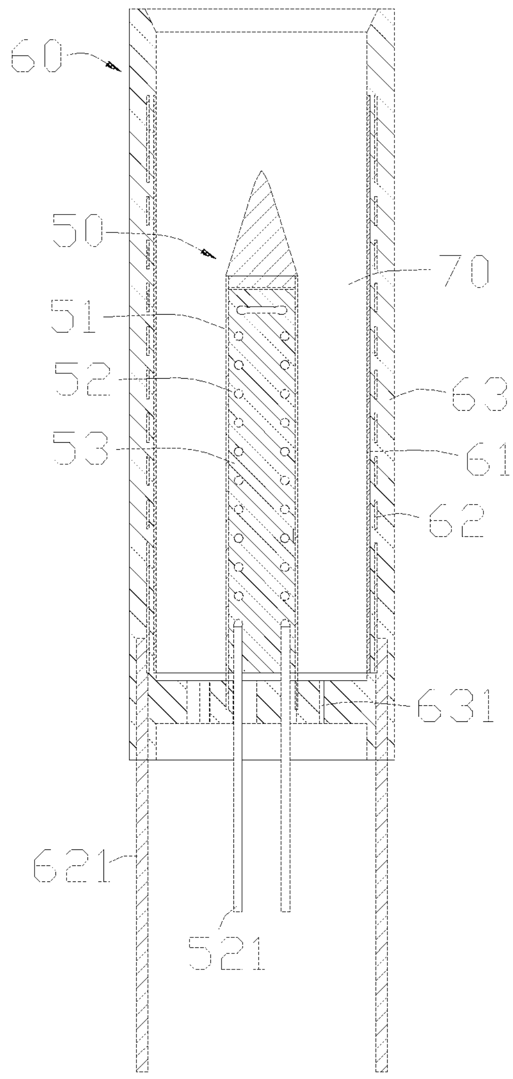
FIG. 9 is a sectional view of a heating device according to a fifth embodiment of the present disclosure.

As shown in FIG. 9, a heating device of a fifth embodiment of the present disclosure includes a first heating assembly 50 and a second heating assembly 60. The first heating assembly 50 axially extends in the second heating assembly 60, and an annular space 70 is defined between an outer circumference of the first heating assembly 50 and an inner circumference of the second heating assembly 60 for receiving the tobacco.

Wherein, the first heating assembly 50 includes a first housing 51, a first heating element 52 inserted in the first housing 51, and a first insulator 53 disposed in the first housing 51 and covers the first heating element 52. An outer surface of the first housing 51 defines a heating surface in contact with the tobacco. The first heating assembly 50 may be any one of the first heating elements in the first to third embodiments described above.

The second heating assembly 60 includes a tubular second housing 61 with two open end, a second insulator 63 sleeved on the outer circumference of the second housing 61, and a second heating element 62 embedded in the second insulator 63 and located on the outer periphery of the second housing 61. Two pins 621 of the second heating element 62 and two pins 521 of the first heating element 52 extend out of the second insulator 63 for being connected with an external power supply.

The second heating element 62 includes a heating tube, and a side wall of the heating tube is provided with a hollow portion. The specific structure and material selection of the second heating element 62 can be referred to the first heating element 42 in the fourth embodiment shown in FIG. 7.

One end of the second insulator 63 is open and communicated with the annular space 70. Another opposite end of the second insulator 63 is closed to form a closed end, and at least one second vent hole 631 is provided in the closed end. The first heating assembly 50 is fixed on the closed end of the second insulator 63.

The second heating assembly 60 further includes a second high temperature resistant non-stick coating (not shown) provided on the inner surface of the second housing 61, which can withstand a temperature above 300° C. A thickness of the second high temperature resistant non-stick coating is 0.5 μm to 500 μm.

Understandably, the second heating assembly 60 can specifically refer to the first heating assembly in the above-mentioned fourth embodiment.

Compared with the heating devices of the first to fourth embodiments, in this embodiment, the arrangement of the first heating assembly 50 and the second heating assembly 60 is able to heat and atomize the tobacco more fully, thereby to generate more smoke, and meet the corresponding needs of a user.

A manufacturing method for the heating device of the fifth embodiment includes a manufacturing of the first heating assembly 50 and a manufacturing of the second heating assembly 60.

Wherein, the first heating assembly 50 can refer to the manufacturing method for the first heating assembly in the above-mentioned first embodiment. Referring to FIG. 9, the manufacturing of the second heating assembly 60 includes following steps:

S2.1, preparing the second housing 61, the second heating element 62 and the insulating paste of the second insulator 63;

S2.2, placing and fixing the second housing 61 and the second heating element 62 in a forming mold;

Wherein, the second heating element 62 is located on the outer periphery of the second housing 61;

S2.3, injecting the insulating paste into the forming mold, cooling and hardening the insulating paste to form a preform of the second insulator 63, which forms a second semi-finished heating assembly together with the second housing 61 and the second heating element 62;

Wherein, the preform is wrapped around the outer peripheries of the second housing 61 and the second heating element 62 and fills the space between the second housing 61 and the second heating element 62;

S2.4, sintering the second semi-finished heating assembly at a high temperature, to solidify the preform to form the second insulator 63, so that the second heating assembly 60 is prepared.

The manufacturing process of the second heating assembly 60 can refer to the manufacturing method for the first heating assembly in the fourth embodiment described above.

Furthermore, the manufacturing method for the heating device of the fifth embodiment further includes: inserting the first heating assembly 50 in the second heating assembly 60 along an axial direction thereof, with an annular space 70 defined therebetween for receiving the tobacco.

Figure 10:
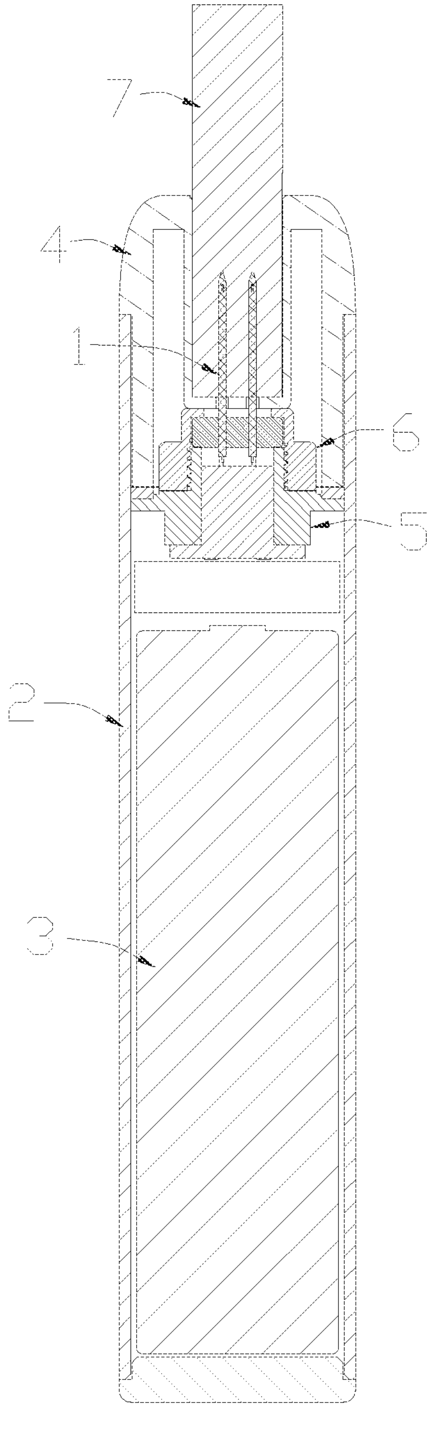
FIG. 10 is a sectional view of a heat-not-burn smoking device according to an embodiment of the present disclosure.

As shown in FIG. 10, a heat-not-burn smoking device of the present disclosure includes a heating device 1, which can be the heating device of any one of the above-mentioned first to fifth embodiments.

The heat-not-burn smoking device of the present disclosure further includes a shell 2, a power supply battery 3, and a cartridge case 4. The power supply battery 3 is arranged in one end of the shell 2. The heating device 1 is arranged in another end of the shell 2, and is fixed in the shell 2 through a matched fixing base 5 and a matched locking block 6 and the like. The heating device 1 is connected to the power supply battery 3, so that the power supply battery 3 can supply power to the heating device.

The cartridge case 4 is disposed on another end of the shell 2, and the heating device 1 is located in the cartridge case 4. In addition, the cartridge case 4 defines an opening communicated with an interior thereof, and the tobacco 7 (which can be made into a cigarette form) is inserted into the cartridge case 4 via the opening and is inserted with the heating device 1. The heating device 1 is powered by the power supply battery 3 to heat the tobacco so as to atomize it to generate smoke.

The above embodiments illustrate only the preferred embodiments of the present disclosure, of which the description is made in a specific and detailed way, but should not be thus construed as being limiting to the scope of the claims of present disclosure. Those having ordinary skill of the art may freely make combinations of the above-described technical features and make contemplate certain variations and improvements, without departing from the idea of the present disclosure, and all these are considered within the coverage scope of the claims of the present disclosure.

What is claimed is:

1. A heating device for a heat-not-burn smoking device, comprising a first heating assembly; wherein the first heating assembly comprises a first housing configured to be in contact with a tobacco, a first heating element disposed inside the first housing and configured to generate heat when electrified, and a first insulator disposed between the first heating element and the first housing; and the first heating element generates heat when electrified, the heat is conducted to the first housing through the first insulator, to heat but not burn the tobacco to generate smoke;

wherein the first heating assembly further includes a first high temperature resistant non-stick coating disposed on a surface, configured for contacting with the tobacco, of the first housing; and a thickness of the first high temperature resistant non-stick coating is 0.5 μm-500 μm.

2. The heating device according to claim 1, wherein one end of the first housing is open to form an open end; an outer surface of the first housing defines a heating surface in contact with the tobacco; and the first heating element is inserted in the first housing along a length direction of the first housing, and two pins of the first heating element extend out of the open end of the first housing; and the first insulator is filled in the first housing and covers the first heating element.

3. The heating device according to claim 2, wherein another end opposite to the open end of the first housing is closed to form a closed end, and the closed end is tapered.

4. The heating device according to claim 2, wherein an insulating base is formed at an end portion of the first insulator; and an end surface of the open end of the first housing is spaced apart or in contact with the insulating base, or an end portion of the open end of the first housing is embedded in the insulating base.

5. The heating device according to claim 2, wherein the first heating element is in a sheet shape, a spiral shape or a tubular shape.

6. The heating device according to claim 2, wherein the heating device further comprises a second heating assembly; the first heating assembly extends axially in the second heating assembly, and an annular space for receiving the tobacco is defined between an outer circumference of the first heating assembly and an inner circumference of the second heating assembly.

7. The heating device according to claim 6, wherein the second heating assembly comprises a tubular second housing with two end open, a second insulator sleeved on an outer circumference of the second housing, and a second heating element embedded in the second insulator and located at an outer periphery of the second housing; and two pins of the second heating element and two pins of the first heating element extend out of the second insulator.

8. The heating device according to claim 7, wherein the second heating assembly further comprises a second high temperature resistant non-stick coating disposed on an inner surface of the second housing; and a thickness of the second high temperature resistant non-stick coating is 0.5 μm to 500 μm.

9. The heating device according to claim 7, wherein one end of the second insulator is open and is communicated with the annular space; and another opposite end of the second insulator is closed to form a closed end, and at least one second vent hole is defined in the closed end; and the first heating assembly is fixed on the closed end of the second insulator.

10. The heating device according to claim 7, wherein the second heating element comprises a heating tube, and a hollow portion is provided in a sidewall of the heating tube.

11. The heating device according to claim 1, wherein the first housing is a housing with two opposite ends open; and an inner surface of the first housing defines a heating surface in contact with the tobacco; and the first insulator is tubular and is sleeved on an outer circumference of the first housing; and the first heating element is embedded in the first insulator along a length direction of the first insulator, and is located on an outer periphery of the first housing; two pins of the first heating element extend out of the first insulator.

12. The heating device according to claim 11, wherein the first heating element comprises a heating tube; and a hollow portion is provided in a sidewall of the heating tube.

13. The heating device according to claim 11, wherein one end of the first insulator is open and communicated with one open end of the first housing to form an inlet for inserting the tobacco into the first housing; and another opposite end of the first insulator is closed to form a closed end, and at least one first vent hole is provided in the closed end.

14. A heat-not-burn smoking device, comprising a heating device comprising a first heating assembly; wherein the first heating assembly comprises a first housing configured to be in contact with a tobacco, a first heating element disposed inside the first housing and configured to generate heat when electrified, and a first insulator disposed between the first heating element and the first housing; and the first heating element generates heat when electrified, the heat is conducted to the first housing through the first insulator, to heat but not burn the tobacco to generate smoke;

wherein the heating device further comprises a second heating assembly; the first heating assembly extends axially in the second heating assembly, and an annular space for receiving the tobacco is defined between an outer circumference of the first heating assembly and an inner circumference of the second heating assembly.

15. The heat-not-burn smoking device according to claim 7, wherein one end of the first housing is open to form an open end; an outer surface of the first housing defines a heating surface in contact with the tobacco; and the first heating element is inserted in the first housing along a length direction of the first housing, and two pins of the first heating element extend out of the open end of the first housing; and the first insulator is filled in the first housing and covers the first heating element.

16. A heating device for a heat-not-burn smoking device, comprising a first heating assembly; wherein the first heating assembly comprises a first housing configured to be in contact with a tobacco, a first heating element disposed inside the first housing and configured to generate heat when electrified, and a first insulator disposed between the first heating element and the first housing; and the first heating element generates heat when electrified, the heat is conducted to the first housing through the first insulator, to heat but not burn the tobacco to generate smoke;

wherein the first housing is a housing with two opposite ends open; and an inner surface of the first housing defines a heating surface in contact with the tobacco; and the first insulator is tubular and is sleeved on an outer circumference of the first housing; and the first heating element is embedded in the first insulator along a length direction of the first insulator, and is located on an outer periphery of the first housing; two pins of the first heating element extend out of the first insulator.

17. The heating device according to claim 16, wherein the first heating element comprises a heating tube; and a hollow portion is provided in a sidewall of the heating tube.

18. The heating device according to claim 16, wherein one end of the first insulator is open and communicated with one open end of the first housing to form an inlet for inserting the tobacco into the first housing; and another opposite end of the first insulator is closed to form a closed end, and at least one first vent hole is provided in the closed end.

* * * * *